Oct. 11, 1966 R. E. NITSCHE ETAL 3,278,286
MEANS FOR SUPPORTING GLASS TUBING DURING THE DRAWING THEREOF
Filed May 23, 1963
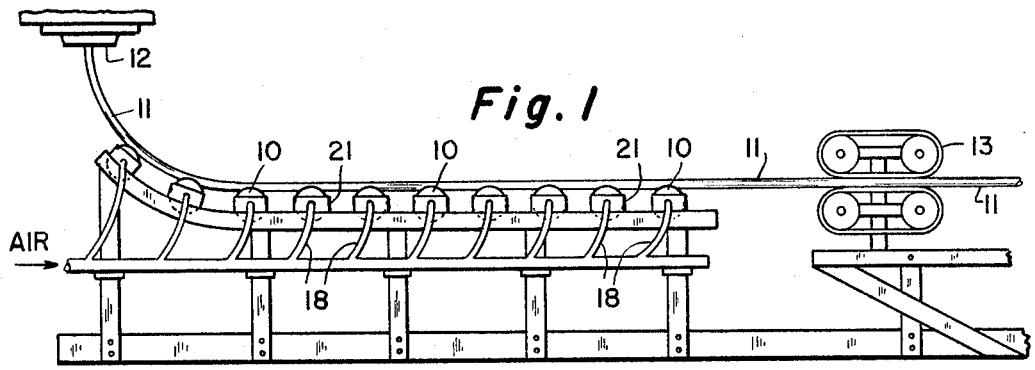
Fig. 1
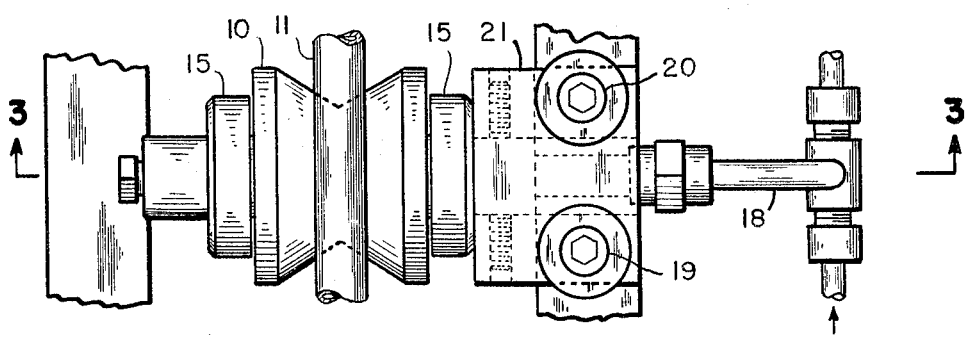
Fig. 2
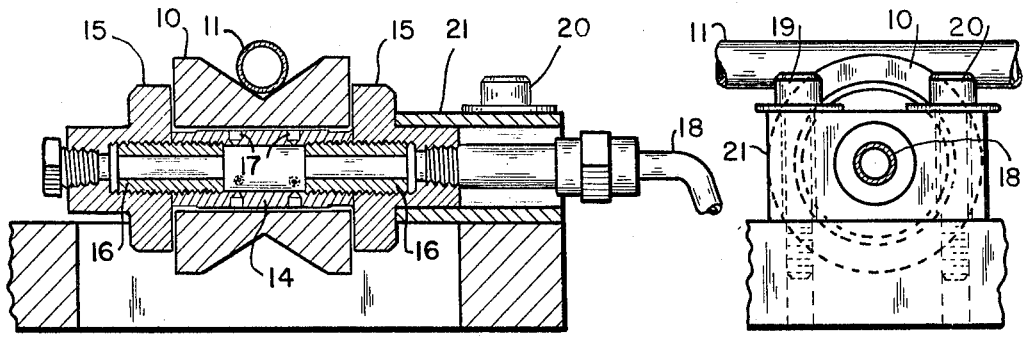
Fig. 3          Fig. 4
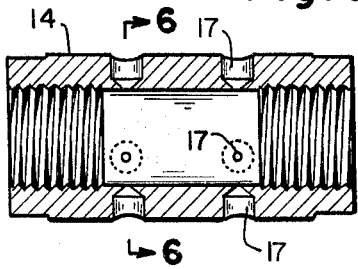    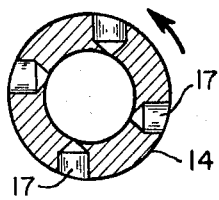
Fig. 5          Fig. 6
INVENTORS
Robert E. Nitsche
Richmond W. Wilson
BY Clarence R. Patty, Jr.
THEIR ATTORNEY United States Patent Office 3,278,286
Patented Oct. 11, 1966

3,278,286
MEANS FOR SUPPORTING GLASS TUBING
DURING THE DRAWING THEREOF
Robert E. Nitsche, Painted Post, and Richmond W. Wilson, Corning, N.Y., assignors to Corning Glass Works, Corning, N.Y., a corporation of New York
Filed May 23, 1963, Ser. No. 282,765
3 Claims. (Cl. 65—170)

The present invention relates to methods for drawing glass tubing and more particularly to improved methods and means for supporting glass tubing immediately after its formation and before the tubing has hardened.

It is well known to those familiar with the art of glass tube drawing that in order to produce tubing having uniform dimensions and smooth surfaces, it is necessary that while the tubing is still plastic it be subjected to a minimum of stresses of the type which cause deformation and marking of the tubing. Inasmuch as the tubing must be supported during the time that it is in the plastic state, it is essential that the supporting means, over which the tubing is drawn, provide minimal resistance to the movement of the tubing.

In the past, soft glass tubing has been drawn over a series of rollers rotating on mechanical bearings, such as ball bearings. The axes of rotation of these rollers, instead of being perpendicular to the direction of motion of the glass tubing, have generally been offset slightly in order to produce a slight rotation of the soft glass tubing about its axis, thereby counteracting the tendency of the glass tubing to sag and to assume thereby a non-cylindrical configuration. It has been found that in order to minimize the deformation of the tubing produced by the drag of such mechanically supported rollers, it has been necessary frequently to maintain and replace the bearings which support the rollers in order to minimize the friction produced by wearing of the bearings. In addition, the minimum obtainable friction in the bearings was such as to require the use of rollers having soft surfaces which would not mar the glass tubing. Such rollers, which were commonly formed of graphite, required frequent replacement. If such rollers and bearings were not frequently replaced, the increased friction in the bearings would produce sufficient drag to deform the glass tubing and to impart to the tubing variable twisting, which instead of merely preventing deformation due to the effects of gravity, would in itself deform the tubing. In addition, the surfaces of the graphite rollers would become rough and would mark the tubing.

Accordingly, it is an object of the present invention to provide means for supporting soft glass tubing as it is being drawn which means produce minimum deformation of the tubing.

A further object is the provision of means for supporting drawn glass tubing which will function for indefinite periods of time without replacement, thus avoiding the necessity for periodically discontinuing the tube drawing operation for the purpose of replacing the supporting means.

A further object is the provision of such means which are self-cooling, and thus dissipate the heat transferred thereto by the hot glass tubing passing thereover.

These and other objects, which will be apparent from the description, are accomplished by the provision of means for supporting soft glass tubing on the draw, which means comprise rollers having grooves therein for supporting the tubing, said rollers being rotatable and being supported by a cushion of a gas, such as air.

The invention will be described with reference to the following drawing, in which:

FIGURE 1 is a side elevational view of a glass tube drawing apparatus,

FIGURE 2 is a top plan view of a single glass tube supporting roller of FIGURE 1, FIGURE 3 is a sectional view taken on line 3—3 of FIGURE 2, FIGURE 4 is an end elevational view of the roller of FIGURES 2 and 3, FIGURE 5 is an axial sectional view of the roller supporting shaft, and FIGURE 6 is a view taken on line 6—6 of FIGURE 5.

Referring to the drawings, the tube supporting means of the present invention comprise rollers 10, which support glass tubing 11 as it emerges from orifice 12 of a tank containing molten glass. The tubing is drawn over the rollers by means of tractor 13.

The structure of one of rollers 10 and its supporting apparatus is illustrated in FIGURES 2-6. Roller 10 rotates about shaft 14, the structure of which is illustrated in detail in FIGURES 5 and 6, and axial movement of the shaft is prevented by means of end caps 15. When the outer diameter of shaft 14 is approximately ¾ inch, the inner diameter of roller 10 is approximately .003 inch larger than the outer diameter of the shaft. In addition, a clearance of approximately .003 inch is maintained between roller 10 and each of end caps 15. Both the end caps and the roller are threaded over adaptors 16.

As illustrated in FIGURES 5 and 6, shaft 14 is hollow and is provided with a plurality of channels 17 extending therethrough. Since end caps 15, adaptors 16 and mounting block 21 are all hollow, air supplied at a pressure of approximately 30 p.s.i. through air tube 18 passes through channels 17 in shaft 14, impinges on the inner surface of roller 10 and travels through the annular space between the inner surface of roller 10 and the outer surface of shaft 14 and between the ends of roller 10 and the surfaces of end caps 15. The effect of this air is to maintain a continuous air cushion occupying a space between the roller and the shaft and end caps. The roller is thereby permitted to rotate at the same speed as tubing 11, the air cushion providing a virtually frictionless bearing.

Although it might at first appear, due to to the symmetric distribution of channels 17 about the axis of the shaft, that the sum of both the horizontal and the vertical components of the forces exerted by the air impinging the inner surface of the roller would be zero, such is not the case with respect to the vertical components. In operation, roller 10 settles somewhat, thus reducing the clearance between the roller and the top surface of the shaft and increasing the clearance between the roller and the bottom surface of the shaft. Thus, due to the fact that the top of the inner surface of the roller is closer to the air jets issuing from channels 17 than is the bottom of the inner surface of the roller, the force of each air jet against the top of the roller is greater than that of the corresponding jet impinging upon the bottom of the roller, thus opposing the force of gravity on the roller and the downward force of the tubing on the roller. Thus, when the device is in operation, the axis of revolution of the roller will be slightly below the geometric axis of the shaft, its precise position being determined as that where the net vertical component of the forces of the air jets against the roller is equal and opposite to that produced on the roller by gravity and the downward force of the tubing.

As can be seen from FIGURE 6, channels 17 of shaft 14 do not extend radially, but are offset so as to produce a slight force tending to rotate roller 10 in the direction of the motion of tubing 11, or as illustrated by the arrow in FIGURE 5. Due to the extremely low friction of the air bearing supporting roller 10, and due to the tendency of the air to effect rotation of the roller in the direction of motion of the tubing, there is virtually no drag produced on the tubing by the roller. As previously mentioned, due to the lack of drag on the tubing, roller 10 may be made of a metal, for example, stainless steel, thereby allowing the roller to be utilized for times longer than those permitted by conventional graphite rollers.

Althoug preferable, it is not necessary that channels 17 be offset as illustrated. The advantages of a virtually frictionless bearing and the resultant lack of drag on the tubing may be realized in a device in which the channels of the supporting shaft extend radially.

Due to the absence of mechanical contact between the single moving part of the present structure and the remainder of the structure, there is virtually no wear to produce the increased friction characteristic of prior devices. Thus, tubing having extremely uniform dimensions can be produced virtually indefinitely without repair or replacement of the rollers supporting the tubing. In addition, since cold air is continuously being circulated around the roller, there is no tendency for the structure to overheat due to heat transfer from the hot glass tubing. When the device is adjusted, by means of adjusting bolts 19 and 20, in order horizontally to reorient the axis of rotation of the roller in order to produce slight rotation of the tubing and thereby prevent deformation of the tubing due to the effects of gravity, the amount of rotation imparted to the tubing will remain constant with time and will not vary with the amount of use to which the supporting device is subjected.

Although the present invention has been described with reference to its utility in processes for drawing hollow glass tubing, the invention is equally applicable to processes for forming solid glass rods, and, as used herein, the term "tubing" is intended to include both solid and hollow structures.

It is to be understood that the present invention is not to be limited to the specific structure illustrated as a preferred means for supporting drawn glass tubing on a gas-cushioned roller, but rather that the invention resides in the use of a gas cushion or bearing to support the rollers across which glass tubing is drawn. Means other than a shaft may be employed for supporting a roller by means of gas directed thereagainst. For example, roller 10 may be supported from beneath the roller by a housing having a surface complementary to a portion of the surface of the roller and having channels for directing gas jets against the roller to support it in a bed of gas. Accordingly, it is intended that the present invention be limited only by the scope of the appended claims.

What is claimed is:

1. In apparatus for forming glass tubing, which apparatus comprises a source of molten glass, means for drawing tubing from said source of molten glass and a plurality of rollers arranged along the path of said tubing and having outer surfaces comprising annular grooves for supporting said tubing during the drawing thereof, the improvement which comprises support means for said rollers comprising means for directing gas through said support means against said rollers with a velocity sufficient to support said rollers thereon.

2. The improvement according to claim 1 wherein each said roller has an inner surface in the form of a surface of revolution surrounding a shaft having an outer surface in the form of a surface of revolution generally complementary to said inner surface of said roller, said shaft having channels communicating between a source of gas at a pressure higher than that of the ambient atmosphere and an annular space between said inner surface of said roller and said outer surface of said shaft.

3. The improvement according to claim 2 in which said channels are located such that gas emitted therefrom exerts a force on said inner surface of said roller tending to rotate said roller in the direction of motion of said tubing as said tubing is being drawn.

References Cited by the Examiner
UNITED STATES PATENTS

| | | | |
|---|---|---|---|
| 1,876,031 | 9/1932 | Soubier | 65—187 |
| 1,951,993 | 3/1934 | Pond | 65—187 X |
| 2,009,326 | 7/1935 | Sanchez-Vello | 65—187 X |
| 2,009,793 | 7/1935 | Sanchez-Vello | 65—86 X |
| 2,054,055 | 9/1936 | Klahn. | |
| 2,645,534 | 7/1953 | Becker. | |
| 3,110,528 | 11/1963 | Parker. | |

DONALL H. SYLVESTER, *Primary Examiner.*

F. W. MIGA, *Assistant Examiner.*